US009696335B2

United States Patent
Qian et al.

(10) Patent No.: US 9,696,335 B2
(45) Date of Patent: Jul. 4, 2017

(54) HOT WIRE ANEMOMETER HAVING TWISTED CARBON NANOTUBE COMPOSITE WIRE DETECTING ELEMENT

(71) Applicant: Beijing FUNATE Innovation Technology Co., LTD., Beijing (CN)

(72) Inventors: Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 258 days.

(21) Appl. No.: 14/693,894

(22) Filed: Apr. 23, 2015

(65) Prior Publication Data
US 2015/0309067 A1     Oct. 29, 2015

(30) Foreign Application Priority Data

Apr. 23, 2014  (CN) .......................... 2014 1 0164342

(51) Int. Cl.
*G01F 1/68*       (2006.01)
*G01P 5/12*       (2006.01)

(52) U.S. Cl.
CPC ...................................... *G01P 5/12* (2013.01)

(58) Field of Classification Search
None
See application file for complete search history.

(56) References Cited

U.S. PATENT DOCUMENTS

| 3,333,470 | A | * | 8/1967 | Fingerson | ............ F01D 21/003 374/148 |
| 4,393,697 | A | * | 7/1983 | Sato | ......................... G01F 5/00 73/114.34 |
| 4,856,330 | A | * | 8/1989 | Honda | .................... G01P 13/02 73/170.12 |
| 5,423,213 | A | * | 6/1995 | Yajima | .................... G01F 1/684 73/204.26 |
| 8,318,295 | B2 | | 11/2012 | Wang et al. | |
| 2008/0170982 | A1 | | 7/2008 | Zhang et al. | |
| 2011/0036828 | A1 | * | 2/2011 | Feng | ..................... H05B 3/342 219/529 |
| 2011/0051447 | A1 | | 3/2011 | Lee | |

(Continued)

FOREIGN PATENT DOCUMENTS

| CN | 2178579 | 10/1994 |
| CN | 101437663 | 5/2009 |

(Continued)

*Primary Examiner* — Harshad R Patel
(74) *Attorney, Agent, or Firm* — Steven Reiss

(57) ABSTRACT

A hot wire anemometer utilizing metal-coated carbon naonotube wire includes a detecting element, a signal enlarging element, a signal dealing element, and a display device. The hot wire of the detecting element includes a nanotube composite wire. The carbon nanotube composite wire includes a carbon nanotube wire and a metal layer. The carbon nanotube wire includes a plurality of carbon nanotubes spirally arranged along an axial direction of the carbon nanotube wire. The diameter of the carbon nanotube wire ranges from 50 nanometers to 30 micrometers. The rate of twist of the carbon nanotube wire ranges from 250 t/cm to 300 t/cm. The metal layer is coated on a surface of the carbon nanotube wire. The thickness of the metal layer ranges from 50 nanometers to 5 micrometers.

11 Claims, 4 Drawing Sheets

(56) References Cited

U.S. PATENT DOCUMENTS

| | | | |
|---|---|---|---|
| 2011/0095237 A1 | 4/2011 | Liu et al. | |
| 2011/0155713 A1 | 6/2011 | Wang et al. | |
| 2015/0308873 A1* | 10/2015 | Wang | G01F 1/69 73/204.27 |
| 2015/0310957 A1* | 10/2015 | Qian | H01B 1/04 174/126.2 |

FOREIGN PATENT DOCUMENTS

| | | |
|---|---|---|
| CN | 101633500 | 1/2010 |
| CN | 101976594 | 2/2011 |
| CN | 102040212 | 5/2011 |
| CN | 102111926 | 6/2011 |
| CN | 103276486 | 9/2013 |
| CN | 203178958 | 9/2013 |
| TW | 200939249 | 9/2009 |
| TW | 201241843 | 10/2012 |

* cited by examiner

HOT WIRE ANEMOMETER HAVING TWISTED CARBON NANOTUBE COMPOSITE WIRE DETECTING ELEMENT

CROSS-REFERENCE TO RELATED APPLICATIONS

This application claims priority to Chinese Patent Application No. 201410164342.7, filed on Apr. 23, 2014, the disclosure of which is incorporated herein by reference. The application is also related to copending applications entitled, "BINDING WIRE AND SEMICONDUCTOR PACKAGE STRUCTURE USING THE SAME", filed Apr. 23, 2015 Ser. No. 14/693,892; "CARBON NANOTUBE COMPOSITE WIRE", filed Apr 23, 2015 Ser. No. 14/693,893; "DEFROSTING GLASS, DEFROSTING LAMP AND VEHICLE USING THE SAME", filed Apr 23, 2015 Ser. No. 14/693,895; "WIRE CUTTING ELECTRODE AND WIRE CUTTING DEVICE USING THE SAME", filed Apr. 23, 2015 Ser. No. 14/693,897; "CONDUCTIVE MESH AND TOUCH PANEL USING THE SAME", filed Apr 23, 2015 Ser. No. 14/693,898; "ELECTROMAGNETIC SHIELDING MATERIAL AND CLOTHING USING THE SAME", filed Apr. 23, 2015 Ser. No. 14/693,899; "MASS FLOWMETER", filed Apr. 23, 2015 Ser. No 14/693,901.

FIELD

The present disclosure relates to a hot wire anemometer.

BACKGROUND

Measuring flow velocity of fluids is helpful in a variety of applications, including for example research, metering, and monitoring. One approach for monitoring flow is a so-called hot wire anemometer. The hot wire anemometer uses a heated wire positioned within the flow of media, such as gas, liquid, particle-laden liquid, or the like. As the media flows over the hot wire, heat is transferred from the hot wire to the media, cooling the hot wire. Flow rate can be determined from the temperature variation effects on the hot wire.

The hot wire anemometer has two operating modes. The first one is a constant current mode, the flow rate can be measured by a temperature of the hot wire. In this method, the current of the hot wire remains unchanged, when the media takes part of heat away from the hot wire, a temperature of the hot wire will decrease. Therefore, the greater the flow rate, the lower the temperature of the hot wire. When the temperature of the hot wire changes, the resistance of the hot wire will change and a voltage between two ends of the hot wire will change, thus the flow rate can be measured. The second is a constant temperature mode, the flow rate can be measured by a current of the hot wire. In this method, the temperature of the hot wire remains effectively unchanged (the resistance of the hot wire does not change), the current of the hot wire is varied to maintain the original temperature. The greater the flow rate, the greater the current that is needed to maintain the original temperature, thus the flow rate can be measured by the current taken by the hot wire. Calculation principle of the two operating modes of the hot wire anemometer is based on a relationship between temperature and resistance of the hot wire. That is, the greater the effect on resistance that temperature has on the hot wire, the sensitivity of the hot wire anemometer will be correspondingly higher.

According to the law of electrical resistance, the resistance formula of the metal wire is $R=\rho L/S$, where, $\rho$ is the resistivity of the metal wire, L is the length of the metal wire, S is the cross sectional area of the metal wire. The resistivity $\rho$ is associated with the temperature of the metal wire. When the length of the hot wire is unchanged, the smaller cross sectional area is, the greater the resistance of the hot wire is effected by the temperature. Therefore, the smaller a diameter of the hot wire, the higher will be the sensitivity of the hot wire anemometer.

However, when a diameter of the hot wire made of metal or alloy that is micrometer size or less, the hot wire is easily broken. Therefore, the sensitivity of the conventional hot wire anemometer is bad, and a life of the hot wire is short.

BRIEF DESCRIPTION OF THE DRAWINGS

Implementations of the present technology will now be described, by way of example only, with reference to the attached figures.

DETAILED DESCRIPTION

Figure 1:
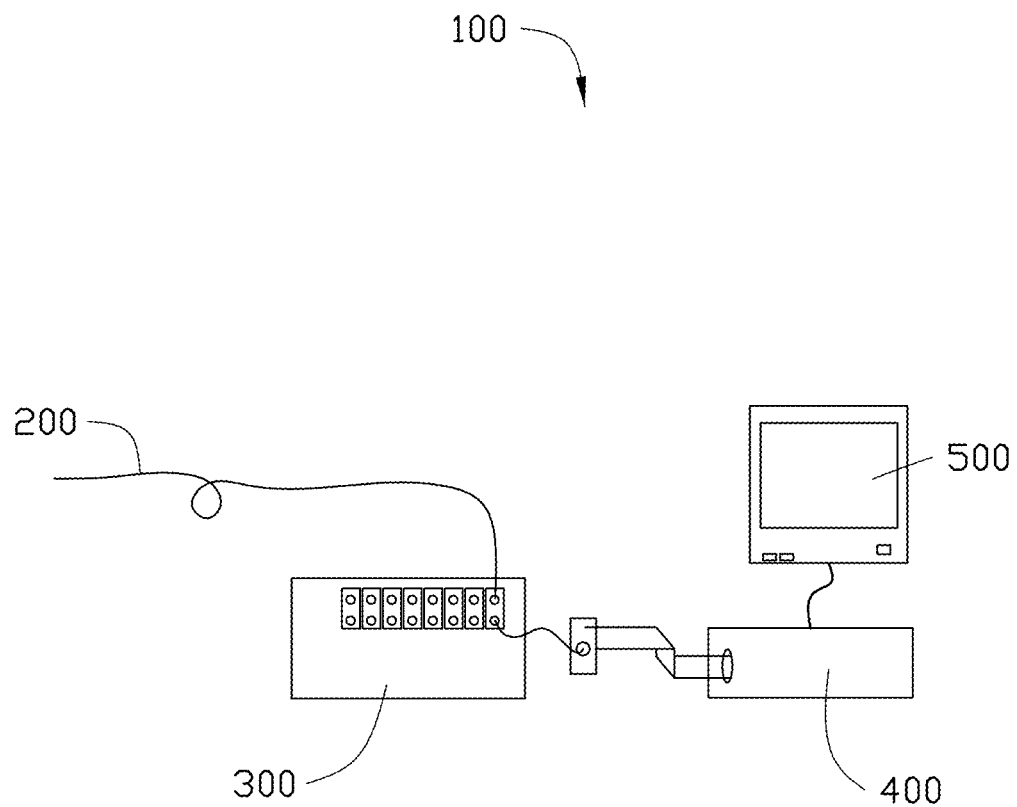
FIG. 1 is a schematic view of an embodiment of a hot wire anemometer.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprise" or "comprising" when utilized, means "include or including, but not necessarily limited to"; it specifically indicates open-ended inclusion or membership in the so-described combination, group, series, and the like.

Referring to FIG. 1, a hot wire anemometer 100 according to one embodiment is provided. The hot wire anemometer 100 comprises a detecting element 200, a signal enlarging element 300, a signal processing element 400, and a display device 500 electrically connect with each other. The detecting element 200 is used to detect a signal of a flow of a media. The signal enlarging element 300 is used to receive and amplify the signal detected by the detecting element 200, and transfer the signal to the signal processing element 400. The signal processing element 400 is used to perform calculations regarding the signal and obtain a flow rate, and display the flow rate by the display device 500.

Figure 2:
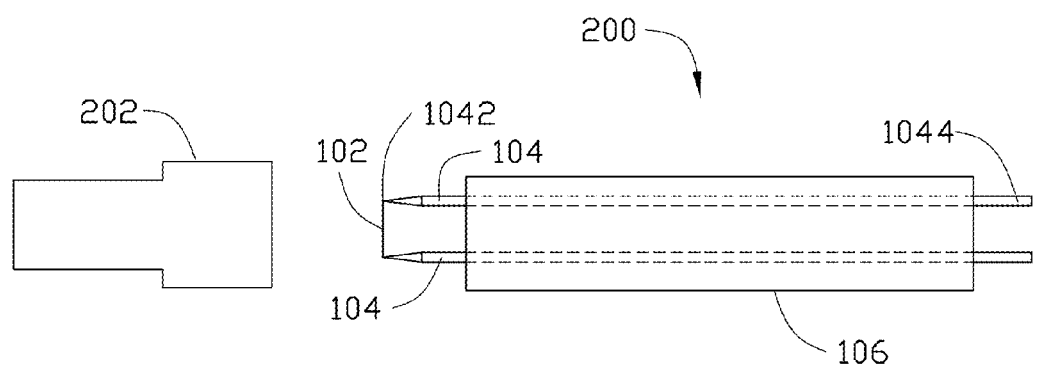
FIG. 2 is a schematic view of an embodiment of a detecting element.

Referring to FIG. 2, the detecting element 200 comprises a hot wire 102, two conductive support rods 104, and one support substrate 106. Each of the conductive support rod 104 comprises a first end 1042 and a second end 1044. The two conductive support rods 104 are fixed on the support substrate 106. Two ends of each conductive support rod 104 are extended outside of the support substrate 106. The two conductive support rods 104 are spaced from each other. The hot wire 102 comprises a first end and a second end. The first end and the second end of the hot wire 102 are respectively fixed by two first ends 1042 of the two conductive support rods 104. The two second ends 1044 of the two conductive support rods 104 are connected to the signal enlarging element 300.

The first end 1042 of the conductive support rod 104 may be a pointed tip. The conductive support rod 104 is used to support the hot wire 102 and apply a current to the hot wire 102. Material of the conductive support rod 104 can have good electrical conductivity and small heat transfer coefficient, and should also have a high strength and rigidity. In one embodiment, the conductive support rod 104 is a gold plated stainless steel wire. A diameter of the conductive support rod 104 ranges from 10 micrometers to 5 millimeters. The two conductive support rods 104 are substantially parallel and spaced from each other. The first end of the hot wire 102 is fixed by one first end 1042 of the conductive support rod 104 and the second end of the hot wire 102 is fixed by one first end 1042 of the other conductive support rod 104. Therefore, the hot wire 102 is suspended in the air.

The support substrate 106 is used to support the conductive support rod 104. Material of the support substrate 106 is an insulating material. In one embodiment, the support substrate 106 is made of a ceramic. The conductive support rod 104 is fixed on the support substrate 106 by sintering.

The detecting element 200 can further comprise a protective cover 202 for protecting the hot wire 102. When the hot wire anemometer 100 is not working, the protective cover 202 is used to cover the hot wire 102. The protective cover 202 is fixed on, but easily detachable from, the support substrate 106 by a mechanical method.

Figure 3:
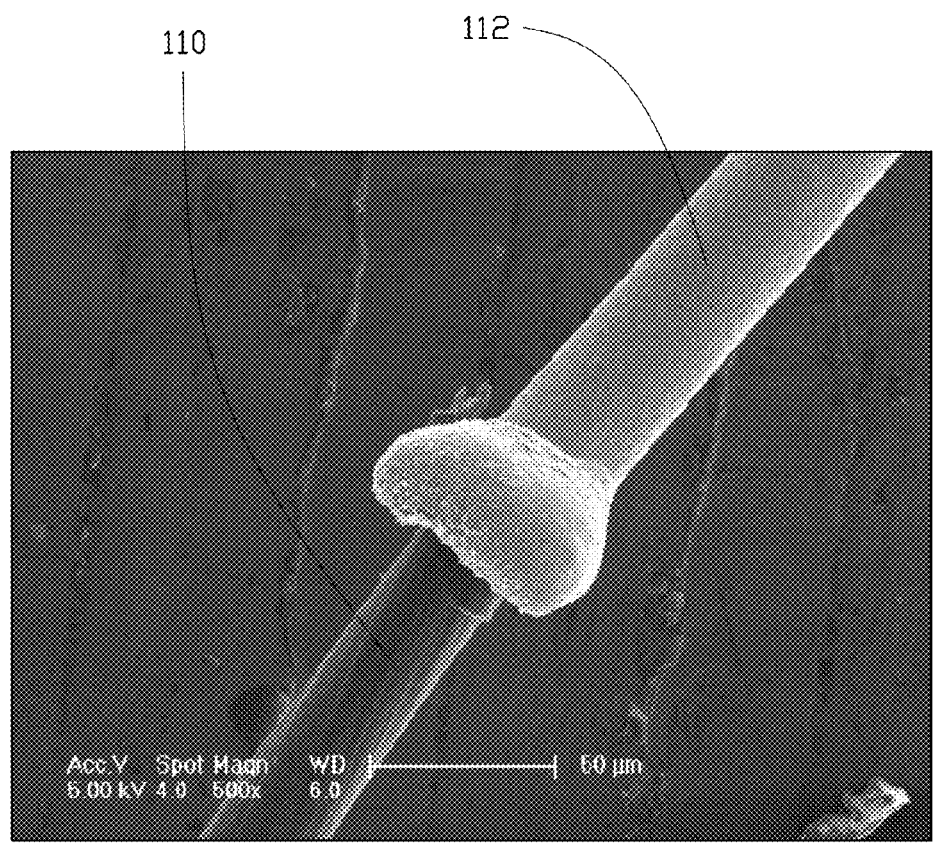
FIG. 3 is a scanning electron microscope (SEM) image of an embodiment of carbon nanotube composite wire.

Referring to FIG. 3, the hot wire 102 comprises a carbon nanotube composite wire. In one embodiment, the hot wire 102 consists of a carbon nanotube composite wire. A diameter of the carbon nanotube composite wire ranges from 150 nanometers to 40 micrometers. In one embodiment, the diameter of the carbon nanotube composite wire is less than 10 micrometers. The carbon nanotube composite wire comprises a carbon nanotube wire 110, sometimes referred to as a carbon nanotube yarn, and a metal layer 112 coated on a surface of the carbon nanotube wire 110.

The carbon nanotube wire 110 comprises a plurality of carbon nanotubes spirally arranged along an axial direction of the carbon nanotube wire 110. In one embodiment, the carbon nanotube wire 110 consists of a plurality of carbon nanotubes spirally arranged along the axial direction of the carbon nanotube wire 110. The plurality of carbon nanotubes are secured together by van der Waals force. The carbon nanotube wire 110 is formed by twisting a carbon nanotube film. The carbon nanotube film can be drawn from a carbon nanotube array. The carbon nanotube film comprises a plurality of carbon nanotubes parallel with each other. In one embodiment, the carbon nanotube film can be twisted clockwise to form an S-twist; in another embodiment, the carbon nanotube film can be twisted counterclockwise direction to form a Z-twist. The plurality of carbon nanotubes in the carbon nanotube film are substantially oriented along an axial direction of the carbon nanotube film, and joined end-to-end by van der Waals force in the axial direction of the carbon nanotube film. Therefore when the carbon nanotube film is twisted, the plurality of carbon nanotubes in the carbon nanotube wire 110 are spirally arranged along the axial direction, and joined end to end by van der Waals force in an extended direction of the plurality of carbon nanotubes.

During the twisting process of the carbon nanotube film, a space between adjacent carbon nanotubes will becomes smaller along the axial direction of the carbon nanotube film, and a contact area between the adjacent carbon nanotubes will increase. Therefore, in the axial direction of the carbon nanotube wire 110, the van der Waals force between the adjacent carbon nanotubes is increased, and the adjacent carbon nanotubes in the carbon nanotube wire 110 are closely connected. In one embodiment, the space between adjacent carbon nanotubes in the axial direction of the carbon nanotube wire 110 is less than 10 nm. In one embodiment, the space between adjacent carbon nanotubes in the axial direction of the carbon nanotube wire 110 is less than 5 nm. In another embodiment, the space between adjacent carbon nanotubes in the axial direction of the carbon nanotube wire 110 is less than 1 nm. Since the space between adjacent carbon nanotubes in the axial direction of the carbon nanotube wire 110 is small, and adjacent carbon nanotubes are closely connected by van der Waals force, the surface of the carbon nanotube wire 110 is smooth and has a high density. Since the carbon nanotube wire 110 has a smooth and dense surface structure, the metal layer 112 and the carbon nanotube wire 110 can form a close bond.

A diameter of the carbon nanotube wire 110 ranges from about 50 nanometers to about 30 micrometers. A twist of the carbon nanotube wire 110 ranges from about 10 t/cm (turns per centimeter) to about 300 t/cm. The twist is the number of turns per unit length of the carbon nanotube wire. With an increase in the twist, the space between adjacent carbon nanotubes in the axial direction of the carbon nanotube wire 110 is reduced, and an attractive force between adjacent carbon nanotubes will increase. However, when the increase in the twist becomes too large, the attractive force between adjacent carbon nanotubes will be reduced.

Thus, a predetermined twist, to the optimal diameter, gives the carbon nanotube wire 110 excellent mechanical properties.

When the diameter of the carbon nanotube wire 110 is less than 10 micrometers, the twist of the carbon nanotube wire 10 ranges from about 250 t/cm to about 300 t/cm. When the diameter of the carbon nanotube wire 110 ranges from about 10 micrometers to about 20 micrometers, the twist of the carbon nanotube wire 10 ranges from about 200 t/cm to about 250 t/cm. When the diameter of the carbon nanotube wire 110 ranges from about 25 micrometers to about 30 micrometers, the twist of the carbon nanotube wire 10 ranges from about 100 t/cm to about 150 t/cm. The mechanical strength of the carbon nanotube wire 110 is 5 to 10 times stronger than the mechanical strength of gold wire of the same diameter. In one embodiment, the diameter of the carbon nanotube wire 110 is about 25 micrometers, and the twist of the diameter of the carbon nanotube wire 110 is about 100 t/cm.

The metal layer 112 is uniformly coated on the outer surface of the carbon nanotube wire 110. A thickness of the metal layer 112 ranges from about 50 nanometers to about 5 micrometers. When the thickness of the metal layer 112 ranges from about 1 micrometer to about 5 micrometers, the conductivity of the carbon nanotube composite wire can reach 50% or more of the conductivity of the metal layer 112. When the thickness of the metal layer 112 is too small, for example less than 1 micrometer, the electrical conductivity of carbon nanotube composite wire is not significantly improved. On the contrary, the metal layer 112 will be easily oxidized, and the conductivity and life of the carbon nanotube composite wire will be further reduced. In addition, experiments show that when the thickness of the metal layer 112 is greater than a certain value, for example greater than 5 micrometers, the conductivity of the carbon nanotube composite wire does not significantly increase along with the increase of the diameter of the carbon nanotube composite wire.

The material of the metal layer 112 may be a metal or metal alloy with good conductivity, such as gold, silver, or copper. In one embodiment, the material of the metal layer 112 is copper, the thickness of the metal layer 112 is about 5 micrometers. The conductivity of the carbon nanotube composite wire can reach $4.39 \times 10^7$ S/m, the conductivity of the carbon nanotube composite wire is about 75% of the conductivity of copper metal.

Figure 4:
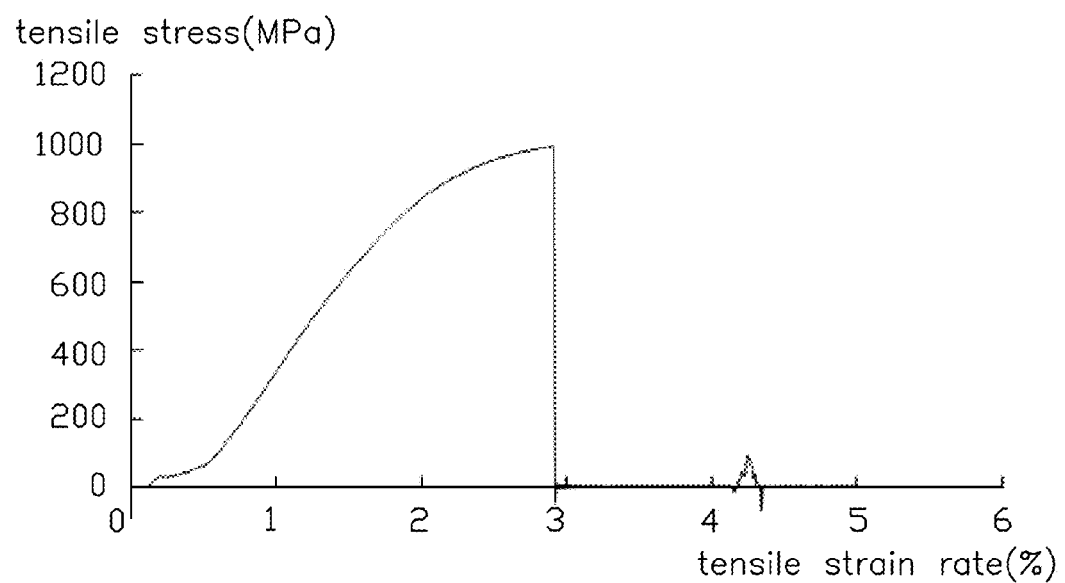
FIG. 4 is a tensile stress chart of the carbon nanotube composite wire.

FIG. 3 illustrates that in one embodiment, the diameter of the carbon nanotube composite wire is about 35 micrometers. FIG. 4 illustrates that tensile stresses on an embodiment of the carbon nanotube composite wire can reach 900 MPa or more, this being 9 times of that of the gold wire with same diameter. FIG. 4 also shows that a tensile strain rate of the carbon nanotube composite wire is about 3%.

The metal layer 112 can be coated on the outer surface of the carbon nanotube wire 110 by electroplating, electroless plating, or by vapor deposition method.

The material of the hot wire 102 should have strength and a good corrosion resistance. The hot wire 102 can be made as thin as possible, to ensure that the hot wire 102 not only has a high sensitivity, signal to noise ratio, and frequency response, but also has good stability. The carbon nanotube composite wire has good mechanical and mechanical properties when the diameter and twist of the carbon nanotube wire 110, and the thickness of the metal layer, are optimized.

The hot wire anemometer of the present embodiment has the following advantages. First, since the thickness of the metal layer ranges from 50 nanometers to 5 micrometers, the metal layer has good oxidation resistance and durability. Second, the diameter of the carbon nanotube wire ranges from 50 nanometer to 30 micrometers, and the thickness of the metal layer ranges from 50 nanometers to 5 micrometers. Therefore, the diameter of the carbon nanotube composite wire can be in nano-scale. When the carbon nanotube composite wire is used as the hot wire, the diameter of the hot wire can also be in nano-scale, resulting a hot wire having high sensitivity and frequency response. Third, when the carbon nanotube composite wire is used, because the carbon nanotube has good heat resistance, even if the metal layer is fused by a high temperature, the carbon nanotube wire will not easily break, which allows the carbon nanotube composite wire to maintain an electrical connection. Therefore, the durability of the hot wire and the hot wire anemometer can be improved, and the life of the hot wire and the hot wire anemometer is also increased. Fourth, the carbon nanotube composite wire will exhibit an electrical skin effect, the main current will be conducted through the metal layer of the carbon nanotube composite wire. Therefore, the electrical conductivity of the carbon nanotube composite wire is significantly improved.

When the hot wire anemometer 100 is used, the detecting element 200 is placed in the flow field, for example a wind-field. The detecting element 200 detects the signal coming from the hot wire 102, and transfers the signal to the signal enlarging element 300. The signal enlarging element 300 receives and enlarges the signal detected by the detecting element 200, and transfers the signal to the signal processing element 400. The signal processing element 400 performs calculations on the signal to obtain the flow rate, and displays the flow rate by the display device 500.

In use of the hot-wire anemometer 100 is, the detecting element 200 is placed in the flow field being tested, that is the wind farm. The detecting element 200 obtains a signal from the hot wire 102, and then the signal is transmitted to the signal enlarging element 300. The signal enlarging element 300 receives the signal detected by the detecting element 200 and amplifies it. The amplified signal then is passed to the signal processing element 400. After the signal processing element 400 processes the signal with calculations, the velocity flow field can be measured and then displayed by the display device 500.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.H

What is claimed is:

1. A hot wire anemometer comprising:
    a detecting element;
    a signal enlarging element; and
    a signal processing element;
    wherein the detecting element, and the signal enlarging element and the signal processing element are electrically connected to each other; the detecting element comprises a hot wire; the hot wire comprises a carbon nanotube composite wire; the carbon nanotube composite wire comprises a carbon nanotube wire and a metal layer; the carbon nanotube wire comprises a plurality of carbon nanotubes spirally arranged along an axial direction of the carbon nanotube wire, a diameter of the carbon nanotube wire ranges from about 50 nanometers to about 30 micrometers, a twist of the carbon nanotube wire ranges from about 10 t/cm to about 300 t/cm; and the metal layer is coated on a surface of the carbon nanotube wire, and a thickness of the metal layer ranges from about 50 nanometers to about 5 micrometers.

2. The hot wire anemometer of claim 1, wherein the detecting element further comprises two conductive support rods and a support substrate, the two conductive support rods are supported by the support substrate, and the hot wire is supported by the two conductive support rods.

3. The hot wire anemometer of claim 2, wherein each of the two conductive support rods comprises a first end and a second end; and the two conductive support rods disposed on the support substrate, two ends of each conductive support rod are extended outside of the support substrate and spaced from each other, and two ends of the hot wire are respectively fixed by two first ends of the two conductive support rods.

4. The hot wire anemometer of claim 1, wherein the diameter of the carbon nanotube composite wire is less than 10 micrometers.

5. The hot wire anemometer of claim 1, wherein the diameter of the carbon nanotube wire is less than 10 micrometers, and the twist of the carbon nanotube wire ranges from about 10 t/cm to about 300 t/cm.

6. The hot wire anemometer of claim 1, wherein the diameter of the carbon nanotube wire ranges from about 25 micrometers to about 30 micrometers, and the twist of the carbon nanotube wire ranges from about 100 t/cm to about 150 t/cm.

7. The hot wire anemometer of claim 1, wherein the plurality of carbon nanotubes are secured together by van der Waals force.

8. The hot wire anemometer of claim 1, wherein the plurality of carbon nanotubes in the carbon nanotube wire are joined end to end by van der Waals force in an extended direction of the plurality of carbon nanotubes.

9. The hot wire anemometer of claim 8, wherein a space between adjacent carbon nanotubes in the axial direction of the carbon nanotube wire is less than 10 nanometers.

10. The hot wire anemometer of claim 8, wherein a space between adjacent carbon nanotubes in the axial direction of the carbon nanotube wire is less than 5 nanometers.

11. The hot wire anemometer of claim 1, wherein a material of the metal layer is copper, and the thickness of the metal layer is about 5 micrometers.

* * * * *